(12) United States Patent
Kanatani et al.

(10) Patent No.: US 7,387,234 B2
(45) Date of Patent: Jun. 17, 2008

(54) ELECTRONIC BUSINESS CARD PROCESSING DEVICE AND METHOD

(75) Inventors: Ryogo Kanatani, Tokyo (JP); Yasuhiko Mori, Machida (JP)

(73) Assignee: Microsoft Corporation, Redmond, WA (US)

( * ) Notice: Subject to any disclaimer, the term of this patent is extended or adjusted under 35 U.S.C. 154(b) by 221 days.

(21) Appl. No.: 11/023,612

(22) Filed: Dec. 29, 2004

(65) Prior Publication Data

US 2006/0065708 A1 Mar. 30, 2006

Related U.S. Application Data

(60) Provisional application No. 60/614,435, filed on Sep. 29, 2004.

(51) Int. Cl.
G06F 17/00 (2006.01)
G06K 5/00 (2006.01)
G06Q 10/00 (2006.01)

(52) U.S. Cl. .............................. 235/375; 235/380; 705/1

(58) Field of Classification Search ................. 235/375, 235/380; 705/1
See application file for complete search history.

(56) References Cited

U.S. PATENT DOCUMENTS

| | | | |
|---|---|---|---|
| 5,774,117 A | 6/1998 | Kukkal et al. ............... 345/330 |
| 6,254,001 B1 | 7/2001 | Chan ........................... 235/380 |
| 6,442,263 B1 | 8/2002 | Beaton et al. ........... 379/142.04 |
| 6,888,927 B1 * | 5/2005 | Cruickshank et al. .... 379/88.11 |
| 2002/0107938 A1 * | 8/2002 | Moroney et al. ............ 709/218 |
| 2002/0133482 A1 * | 9/2002 | Wen Hung ...................... 707/3 |
| 2002/0188606 A1 | 12/2002 | Sun et al. ....................... 707/10 |
| 2003/0066877 A1 | 4/2003 | Howard et al. .............. 235/380 |
| 2003/0163705 A1 | 8/2003 | Richards, Jr. et al. ........ 713/182 |
| 2004/0019521 A1 * | 1/2004 | Birmingham ................. 705/14 |
| 2004/0243930 A1 * | 12/2004 | Schowtka et al. ........... 715/513 |
| 2005/0122543 A1 * | 6/2005 | Walker ....................... 358/1.18 |
| 2005/0289474 A1 | 12/2005 | Master et al. ................ 715/765 |

* cited by examiner

*Primary Examiner*—Daniel A Hess
(74) *Attorney, Agent, or Firm*—Merchant & Gould P.C.

(57) ABSTRACT

The present invention provides an electronic business card processing device and an electronic business card processing method which can effectively utilize information relating to electronic business cards. A business card is displayed on a display on the basis of stored information. When a cursor is positioned on the displayed business card, a tool bar is displayed on the displayed business card. The tool bar has one or a plurality of buttons. By using information unique to the displayed business card, processing corresponding to a selected button is executed. In another embodiment, in response to positioning of the cursor of the pointing device on a predetermined text field of the business card, a selectable tag is displayed on the displayed business card. An application program associated with the selected tag is started, and the information unique to the text field on which the cursor has been positioned is supplied to the started application program.

28 Claims, 12 Drawing Sheets

FIG.12

ELECTRONIC BUSINESS CARD PROCESSING DEVICE AND METHOD

The present invention claims priority to U.S. provisional patent application Ser. No. 60/614,435 filed Sep. 29, 2004, and incorporated herein in its entirety.

BACKGROUND OF THE INVENTION

1. Field of the Invention

The present invention relates to an electronic business card processing device and method, and more specifically, an electronic business card processing device and an electronic business card processing method for executing electronic business card processings relevant to electronic business cards, a computer readable medium recording computer programs for executing the electronic business card processing method for electronic business cards.

2. Description of the Related Art

Instead of giving another person a business card in a paper form, usually, personal information (hereinafter, referred to as business card information) including a name, an organization name, a telephone number, etc., described in the business card is brought to other person by using an electronic mail through the Internet. As a data format of the business card information used in Internet communications, "RFC 2426-vCard MIME Directory Profile" 1998 is well known.

The business card information to be transmitted in this data format includes a business card image and a plurality of sets of character strings of personal information to be composed with the image. For example, a business card is displayed on the display screen of a receiving side computer as shown in FIG. 1.

The electronic business card shown in FIG. 1 denotes a business card image 100, a company name 101, a title 102, a personal name 103, a postal code 104, a company address 105, an e-mail address 106, a telephone number 107, and a URL 108. In communications of information on the business card, normally, information including character codes of these pieces of information in predetermined variable length or fixed length fields is usually received by a receiving side computer. The receiving side computer arranges the character codes of the fields in a predetermined layout, and a converted image is composed with the business card image 100 and displayed on the display screen.

However, in the case of conventional use of information on an electronic business card, a business card is only displayed on a computer. This poses several problems in which a displayed business card hinders the visual utilization of a user.

First, there is no relation between a business card being displayed and editing of information on the business card. For example, for editing information on a business card, a separate interface which has no relation to the business card being displayed is prepared.

Furthermore, one of the problems is that electronic business card management software occupies the information on the electronic business card. If various pieces of information included in information on an electronic business card can be extracted and released to other application software, more effective information on the electronic business card can be utilized. Furthermore, it is considered that such a method makes it possible to provide business card information that appeals to the sense of sight or hearing to a user, and acquires and provides information relating to the electronic business card information.

SUMMARY OF THE INVENTION

Therefore, an object of the invention is to provide an electronic business card processing device and an electronic business card processing method in which information relating to electronic business cards can be effectively utilized.

According to a first aspect of the invention, an electronic business card processing device relating to the invention is an electronic business card processing device having a display and a pointing device, comprising means for storing information relating to a business card, means for displaying the business card on the display on the basis of the stored information, means for displaying a tool bar on the displayed business card in response to positioning of a cursor of the pointing device on the displayed business card, where the tool bar has one or a plurality of buttons, means for receiving signals from the pointing device that has selected one of the buttons, and means for executing processing corresponding to the selected button by using information unique to the displayed business card.

According to a second aspect of the invention, an electronic business card processing device of the invention includes a display and a pointing device, comprising means for storing information relating to a business card, means for displaying a business card on the display on the basis of the stored information, means for displaying a selectable tag on the displayed business card in response to positioning of a cursor of the pointing device on a predetermined text field of the business card, means for receiving signals from the pointing device that has selected the tag, and means for starting an application program associated with the selected tag and supplying information unique to the text field on which the cursor has been positioned to the started application program.

According to a third aspect of the invention, an electronic business card processing method relating to the invention is executed by an electronic business card processing device having a display, a pointing device, and a memory for storing information relating to business cards, comprising the steps of displaying a business card on the display on the basis of the stored information, displaying a tool bar on the displayed business card when a cursor of the pointing device is positioned on the displayed business card, where the tool bar has one or a plurality of buttons, receiving signals from the pointing device which selected one of the buttons, and executing processing corresponding to the selected button by using information unique to the displayed business card.

According to a fourth aspect of the invention, an electronic business card processing method of the invention is executed by an electronic business card processing device having a display, a pointing device, and a memory storing information relating to business cards, comprising the steps of displaying a business card on the display on the basis of the stored information, displaying a selectable tag on the displayed business card in response to positioning of a cursor of the pointing device on a predetermined text field of the business card, receiving signals from the pointing device that selected the tag, and starting an application program associated with the selected tag and supplying the information unique to the text field on which the cursor has been positioned to the started application program.

According to a fifth aspect of the invention, a computer readable medium relating to the invention stores commands thereon for making a computer to execute the above-mentioned method.

According to the invention, by effectively utilizing information relating to an electronic business card, an effective graphical user interface can be provided.

Furthermore, it is possible that additional information derived from the information relating to the electronic business card is acquired easily and provided to a user.

The above and other objects, effects, features and advantages of the present invention will become more apparent from the following description of embodiments thereof taken in conjunction with the accompanying drawings.

BRIEF DESCRIPTION OF THE DRAWINGS

FIG. 12 shows an example of an image to be displayed on the display screen of a computer on the basis of execution of a browser.

DESCRIPTION OF THE PREFERRED EMBODIMENTS

Hereinafter, embodiments of the invention are described in detail with reference to the accompanying drawings.

Figure 1:
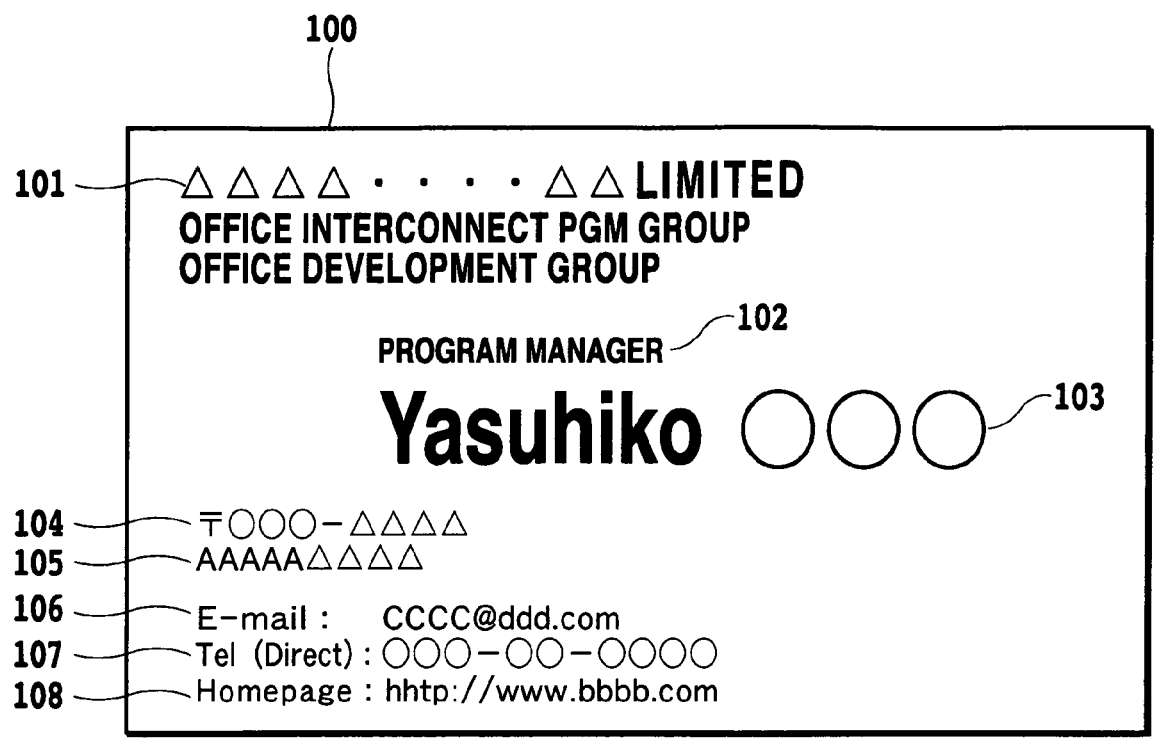
FIG. 1 shows an example of an electronic business card to be displayed on a display screen of a computer.
Figure 2:
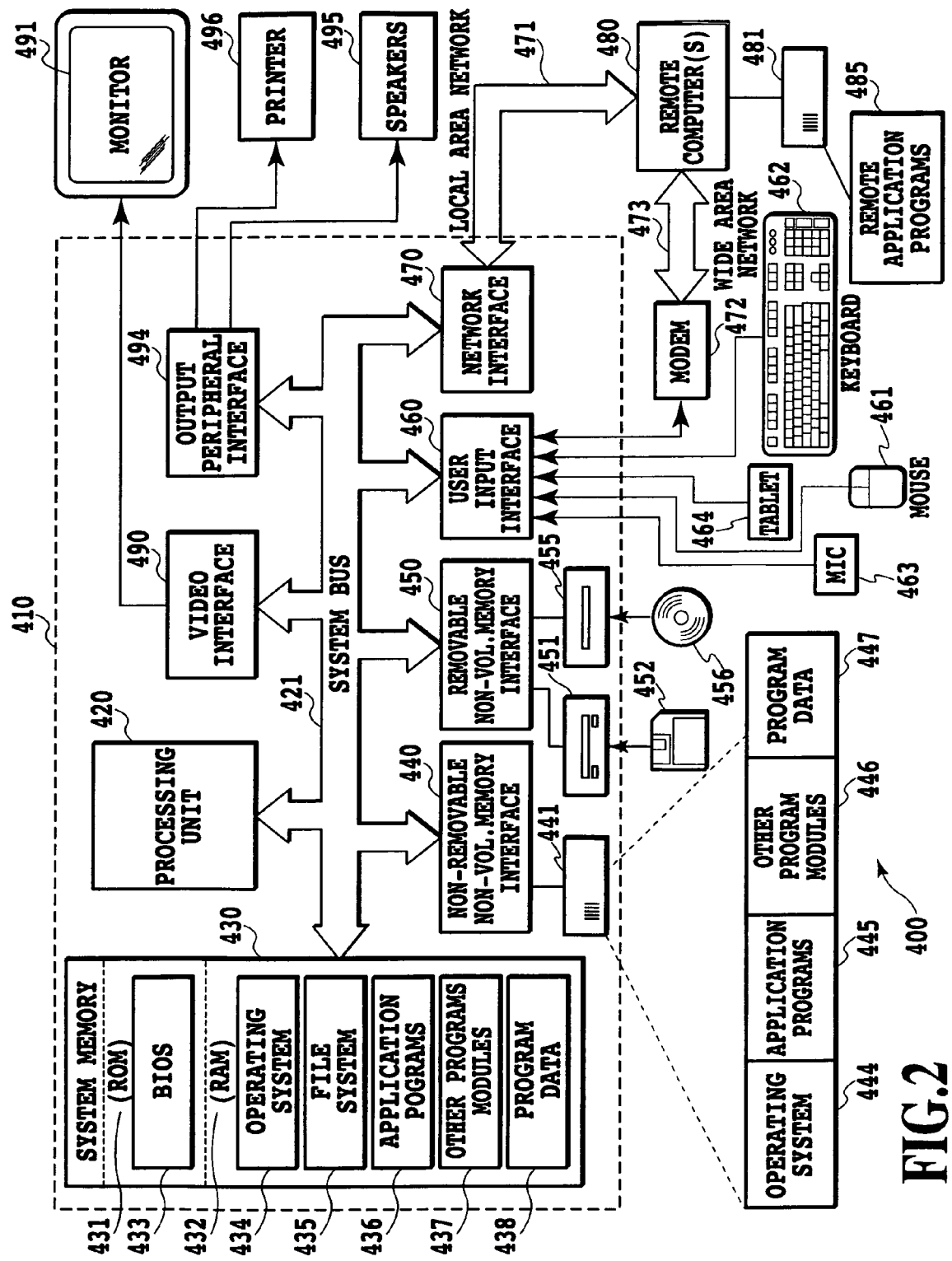
FIG. 2 shows an example of an environment for executing spreadsheet operation considered due to the invention.
Figure 3:
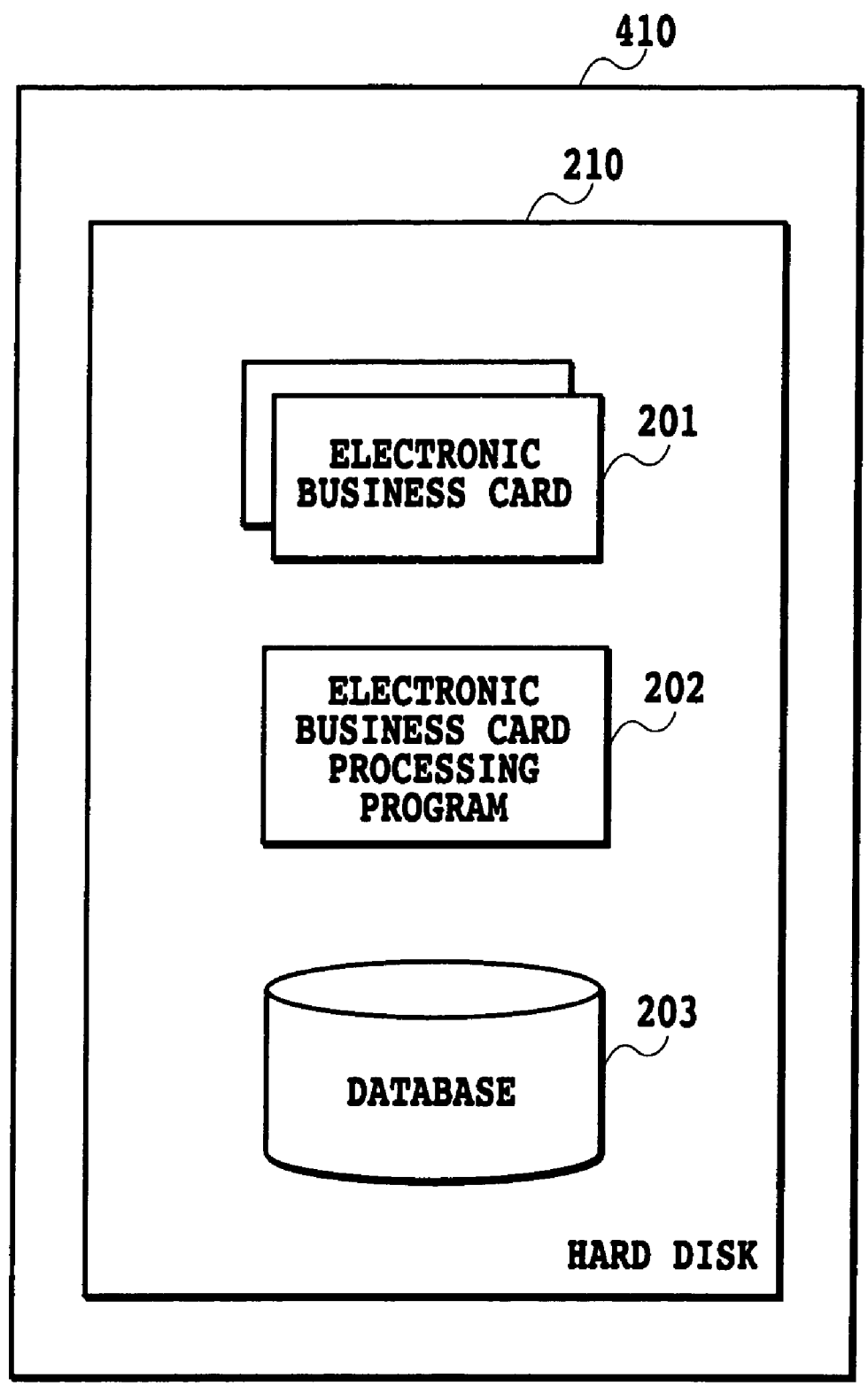
FIG. 3 shows an example of programs and information stored in a storage of a hard disk drive.

In this embodiment, the hard disk drive 441 is used as a storage for an electronic business card 201, an electronic business card processing program 202, and a database 203 as objects (data and programs) relating to the invention as shown in FIG. 3. The electronic business card 201 is created by an electronic business card processing program 202 or received from another PC. The electronic business card 201 is a data set (a set of a plurality of pieces of data) including character strings in the form of character codes and image data of a background image of the business card. The electronic business card processing program 202 has an electronic business card creating function and various functions described later relating to the invention. The electronic business card processing program 202 is installed in the hard disk 210 from a recording medium such as a CD-ROM or a floppy disk. The database 203 stores information for management of a created electronic business card or a received electronic business card and various information relating to the electronic business card. Hereinafter, such information to be stored in the database 203 and managed is referred to as "contact point information." "Contact point information" includes the following information.

(1) Information to be Indicated on Electronic Business Card

The information includes a name, a company name, a title, an address, a telephone number, a facsimile number, and an e-mail address, etc. As the electronic business card, a plurality of pages can be displayed for one person, and in this case, items to be included in the information to be indicated on the electronic business card are grouped for each page to be displayed.

(2) Supplemental Information Such as Date of Creation, Type, Storing Location, and Security Settings of a Created Electronic Business Card (3) Communications Records with Contact Point The communications records include dates of receiving, e-mail addresses of senders, names of the senders of received electronic business cards, and dates of transmission, e-mail addresses of destinations, and destination names of transmitted electronic business cards. Furthermore, the communications records include various communications records with persons introduced by each electronic business card and inputted with a keyboard by a user as related information of the invention.

As examples of the communications information, information showing receiving of New Year's cards, Christmas cards or year-end gifts, and when and where a meeting will be held, and so on.

(4) Address Book Created Based on Personal Information Acquired from Electronic Business Cards (5) Other Contact Point Related Information (Information Showing Events to be Carried Out for Each Contact Point)

These pieces of information are stored in the database 203 by being associated with contact points managed by the device. A plurality of kinds of data may be stored in the database 203 as one record (data set), or the plurality of kinds of information may be stored in the database 203 by information type.

In the hard disk 210, OS programs are further installed, and commercially available programs are well known, so that description thereof is omitted. Furthermore, background images to be used for creating electronic business cards, various data necessary for business card processing, and other application programs (for example, browsers, mailers, messengers, and personal information management programs) are also stored in the hard disk 210.

Hereinafter, information processings relating to the invention are described. The information processings are executed by the electronic business card processing program 202.

Electronic Business Card Creating Function

Details of processings of the electronic business card creating program included in the electronic business card processing program 202 are shown in FIG. 3.

In FIG. 3, when a user selects an electronic business card creating menu of the display screen information, the processing program of FIG. 3 is executed by a processing unit 420. The user selects a desired business card image for a background image from business card design files prepared in advance on the hard disk 210, and opens the image (temporarily stores the image in the system memory 430 and displays it on the display screen of the display (monitor 491)) (Step S301). The business card design files are categorized into three intended uses of company, home, and convenience, and a user can select a desired image from the design files for the desired use.

Next, the user instructs the processing unit 420 to read his/her personal information initially registered to the database 203. In response to this instruction, the processing unit 420 reads the user's personal information (in the form of character codes) from the database 203 and temporarily stores it in the system memory 430 (Step S302).

The processing unit 420 converts the personal information which is personal information temporarily stored in the system memory 430 in the form of character codes into images. The processing unit 420 composes the converted images with the business card image for a background image selected in Step S301 on the system memory and displays these on the display screen (Step S303).

When the user specifies the positions of the personal information on the display screen by using a pointing device, the processing unit 420 moves the personal information to the specified positions. Concretely, the processing unit 420 re-composes a new business card image by arranging personal information images at the positions instructed by the user, and displays the re-composed business card image on the display screen of the monitor 491.

When composition of the electronic business card is finished, the user inputs information to be registered as a part of management information, for example, the type and note information of the electronic business card to the database 203.

When the user instructs ending with a mouse or keyboard, the CPU 221 creates a data set of personal information, layout positions thereof, and background image data, etc., in the data format conforming the electronic business card standards (for example, VCard regulated by RFC2426) and stores these in an exclusive storage area on the hard disk 210. Furthermore, management information relating to the created business card information is registered in the database 203 (Step S304). As the management information for electronic business card creation, a date of creation, personal information (in the form of character codes), an identifier of the business card image for a background image, and information inputted by the user (business card type and note information) are available, and a program designer properly determines the management information.

Figure 4:
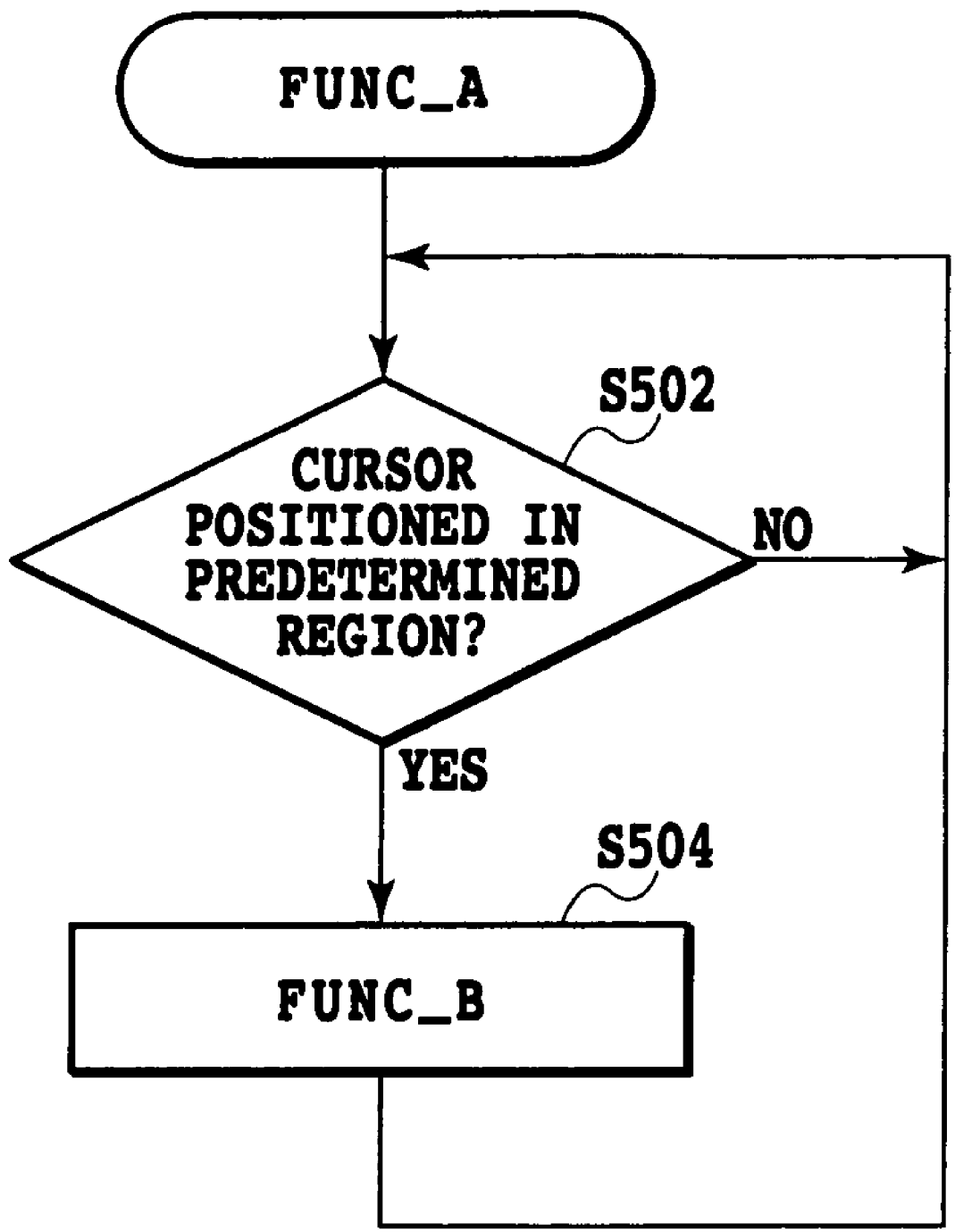
FIG. 4 is a flowchart showing an example of processing to be executed by a computer on the basis of a function contained in a business card information processing program.

FIG. 4 is a flowchart showing an example of processing to be executed by the processing unit of the electronic business card processing device on the basis of one function contained in the business card information processing program. During execution of the business card information processing program, the electronic business card processing device displays an electronic business card on the display screen on the basis of the business card information in response to an instruction from a user, and calls a function func_A shown in FIG. 4. The electronic business card processing device monitors the position of a cursor that moves during display of the electronic business card by receiving signals from the pointing device. Then, when the cursor is positioned in a predetermined area (Step S502), the electronic business card processing device calls a function func_B (Step S504). When the processing of the function func_B is finished, the process returns to Step S502 through Step S504.

First Embodiment

An embodiment in which it is judged whether the cursor is within the business card frame in Step S502 of FIG. 4 is described.

Figure 5:
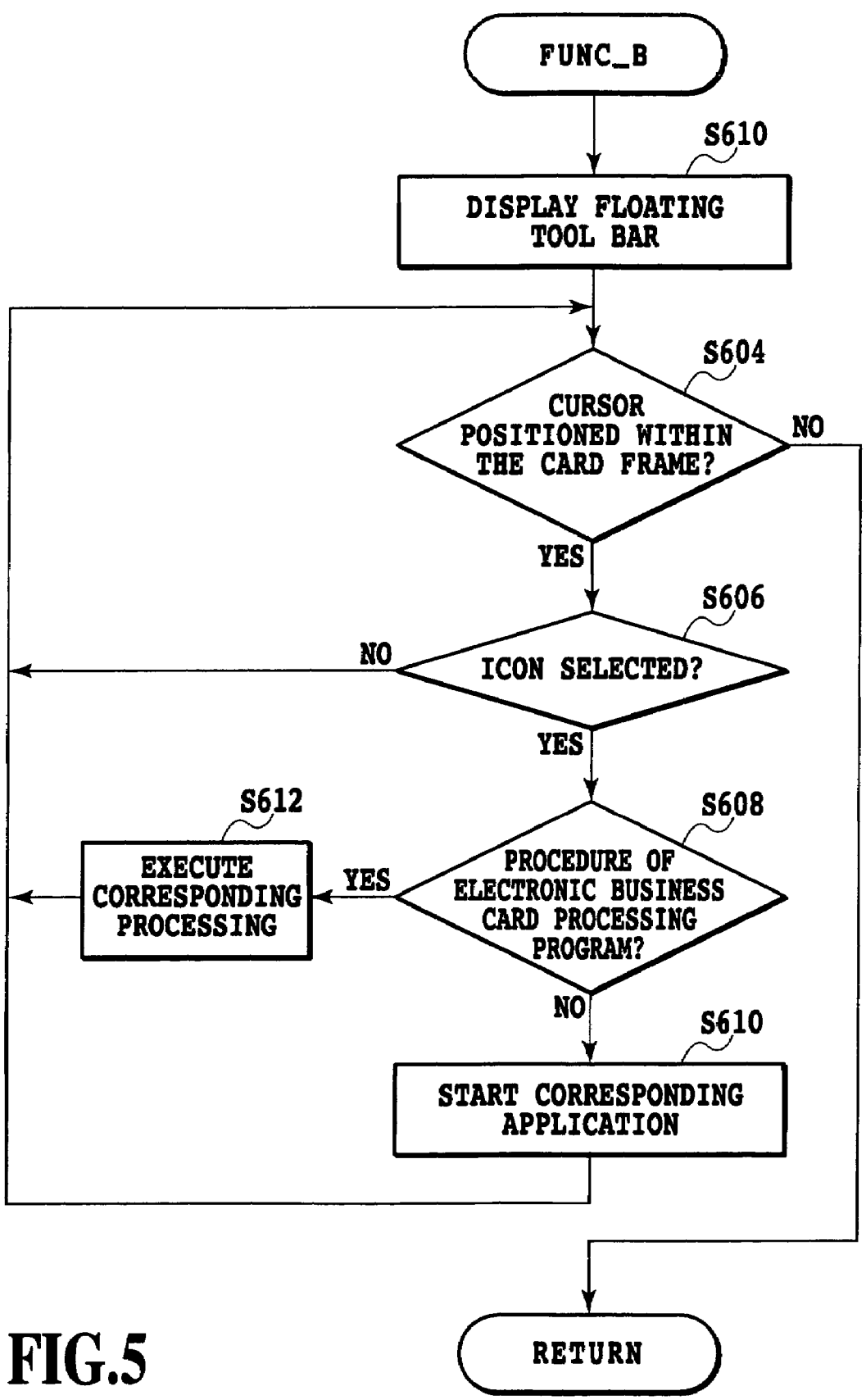
FIG. 5 is a flowchart showing an example of processing to be executed by a computer on the basis of a function contained in the business card information processing program.

FIG. 5 shows an example of processing to be executed by the electronic business card processing device on the basis of the function func_B contained in the business card information processing program. The electronic business card processing device displays a tool bar corresponding to an area in which the cursor is positioned so as to overlap the displayed electronic business card (Step S602). This tool bar includes a plurality of buttons selectable to start a tool (application program) different from the business card information processing program.

During execution of func_B, the electronic business card processing device judges whether the cursor is within the business card frame from the pointing device in Step S604, and when the cursor is positioned out of the business card frame, it returns to the function func_A. When the cursor is within the business card frame, the process transfers to Step S606 and judges whether a button in the tool bar has been selected by using the cursor. Then, when a tag is selected, it is judged whether corresponding processing is processing of the electronic business card processing program itself or processing of another application (Step S608). When it is processing of the electronic business card processing program itself, the corresponding processing is executed (Step S612). When a corresponding processing is processing of another application, a corresponding application is started (Step S608). For starting, information relating to the electronic business card being displayed is supplied to the application as arguments. The electronic business card processing device which has started the application returns to Step S604, and monitors the position of the cursor and icon selection again. Step S608 only makes another application active, and the process returns to Step S604 without interrupting the execution of func_B by the started application. Therefore, the func_B is executed in the background even during execution of the application that has been made active.

Figure 6:
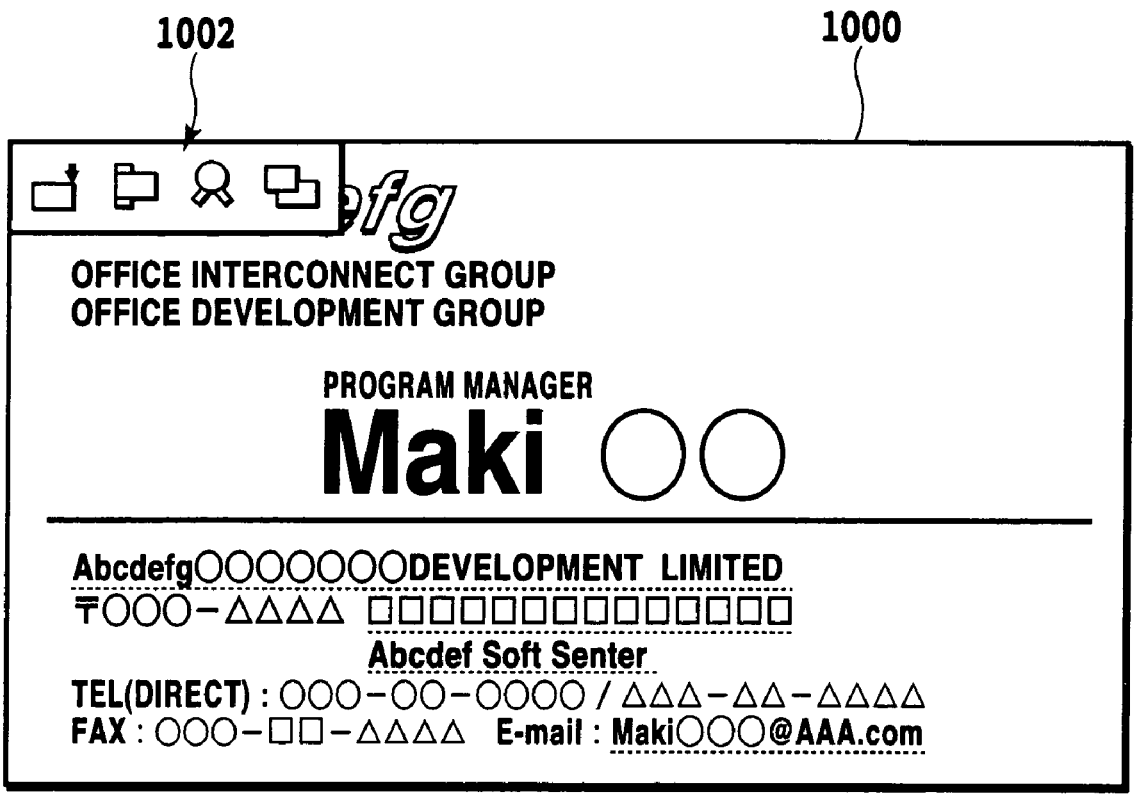
FIG. 6 shows an example of an image to be displayed on the display screen of a computer.

FIG. 6 shows an example of an electronic business card and a tool bar displayed on the display screen of the invention. The electronic business card 1000 is displayed in a part of an area of the display of the electronic business card processing device. The tool bar 1002 includes buttons composed as four icons, and when a user selects a desired icon by using the pointing device, a corresponding application is executed responsively.

Examples of command names associated with icons, command execution conditions, and applications to be started by execution of the commands are shown below.
(1) When personal information and contact point information in the address book are different from each other
(2) When the contact point information contains a voice mail message (.WAV)
(3) When the contact point information contains a video file
(4) Open the vcf file
(5) Update the contact point information
(6) Add or associate a file to the contact point information
(7) Table 1: Correspondence between icons and applications The icon 1 is associated with an Open as VCard command, and this command can always be executed when the tool bar is displayed. By execution of this command, a file in the VCard format (vcf) stored in an exclusive storage area is opened as described above. Thereby, the application associated with the extension vcf is executed. When the application associated with the extension vcf is the electronic business card processing program itself, the electronic business card program displays the electronic business card in the Vcard format.

The icon 2 is associated with the Update command, and this command is executable only when the contact point information and corresponding personal information contained in the address book are different from each other. By execution of this command, the contact point information is updated. When the icon 2 is selected, the electronic business card processing device starts a mailer having an address book function or a personal information management program. Then, when the personal information managed by the started program is different from the contact point information, by using the personal information, the contact point information corresponding to the electronic business card being displayed is updated.

The icon 3 is associated with an Add File command, and this command is always executable when the tool bar is displayed. By execution of this command, a desired file can be associated with the contact point information. Association between the contact point information and a file is advantageous since it makes it possible to automatically supply not only the personal information but also information on the file to the personal information management program when the electronic business card processing program starts the personal information management program and provides contact point information to the personal information management program.

When adding a file, the file can be stored in a predetermined variable length field within the contact point information. Or, it is also possible that the file itself is stored in a different area on the hard disk 210 separately from the contact point information, and its address on the hard disk 210 for reference to the file to be added is stored in a predetermined field within the contact point information.

The icon 4 is associated with a video reproduction command, and this command is executable only when the electronic business card contains a voice mail message (WAV) file. By execution of this command, a voice file reproducing program is started, and reproduction of the voice mail message file contained in the electronic business card is executed.

The icon 5 is associated with a video reproduction command, and this command is executable only when the electronic business card contains a video file. By execution of this command, a video file reproducing program is started, and reproduction of the video file contained in the electronic business card is executed.

When a voice mail message file or a video file is contained in the electronic business card, the information may be stored in a variable length field provided for storing a voice mail message file or a video file in the contact point information. In this case, in response to selection of an icon, the electronic business card processing device supplies the data itself stored in the corresponding field to the voice file reproducing program or a video file reproducing program.

Figure 7:
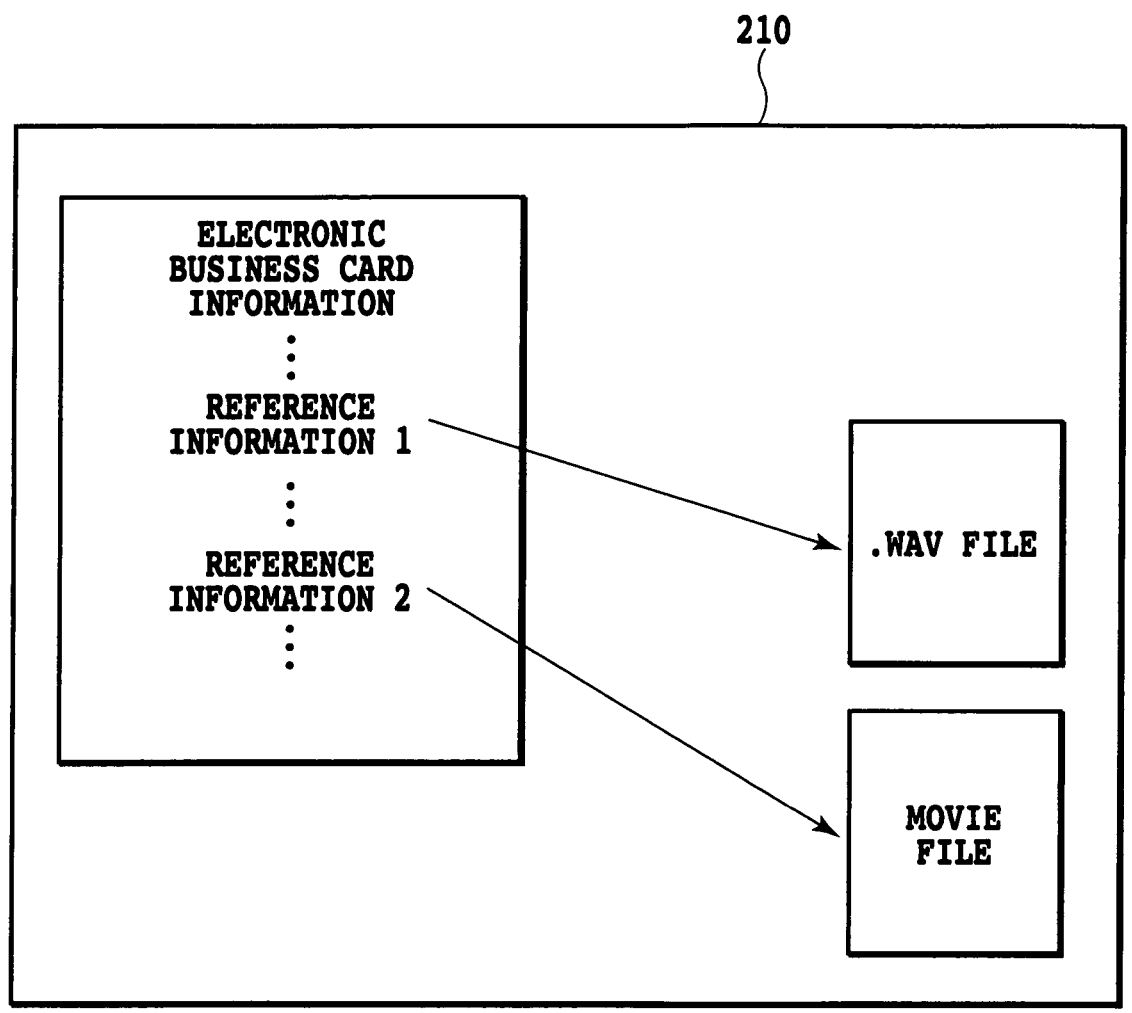
FIG. 7 shows an example of a method for adding a file to electronic business card information.

Or, as shown in FIG. 7, it is also possible that a voice data file or a video file is stored in a different area in the hard disk 210 and data on its address for referring to the file is stored in the contact point information. In this case, in response to selection of an icon, the electronic business card processing device supplies the reference data on the voice mail message file or video file to a voice file reproducing program or a video file reproducing program.

Other processings are as follows.

(1) When the contact point information extends to a plurality of pages, icons for displaying the next page or the previous page may be included in the tool bar. In this case, the electronic business card processing device extracts information on a corresponding page in the contact point information in response to selection of an icon, and re-displays the electronic business card by using the information.

(2) When the data to be displayed in an electronic business card contains animation image data, an icon for executing the animation may be included in the tool bar. In this case, in response to selection of an icon, the electronic business card processing device extracts corresponding animation data in the contact point information and executes the animation. Thereby, the electronic business card processing program can display the electronic business card including the animation.

(3) It is also possible that an icon for registering the personal information contained in the contact point information to the address book may be included in the tool bar. In this case, the electronic business card processing device starts a mailer or a personal information management program having a function of an address book in response to selection of the icon. At this point, personal information contained in the contact point information is supplied as arguments.

Figure 8:
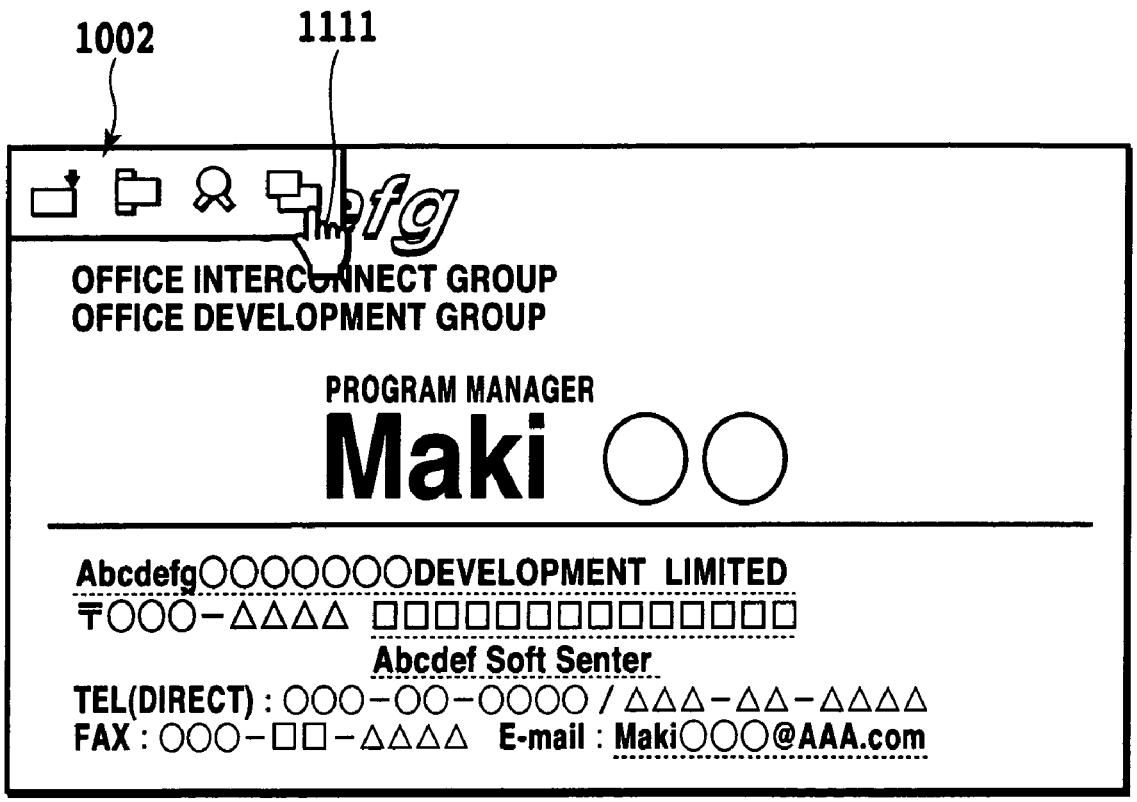
FIG. 8 shows an example of an image to be displayed on the display screen of a computer.

In this embodiment, in order to make it easy to select an icon included in the tool bar, various display schemes may be applied. For example, as shown in FIG. 8, the configuration of the mouse cursor 1111 that hovers above the icons of the tool bar may be different from a normal one. Furthermore, it is also possible that the function of a so-called tool chip for automatically displaying the contents of an icon under the mouse cursor hovering above the icon is employed.

Second Embodiment

Figure 9:
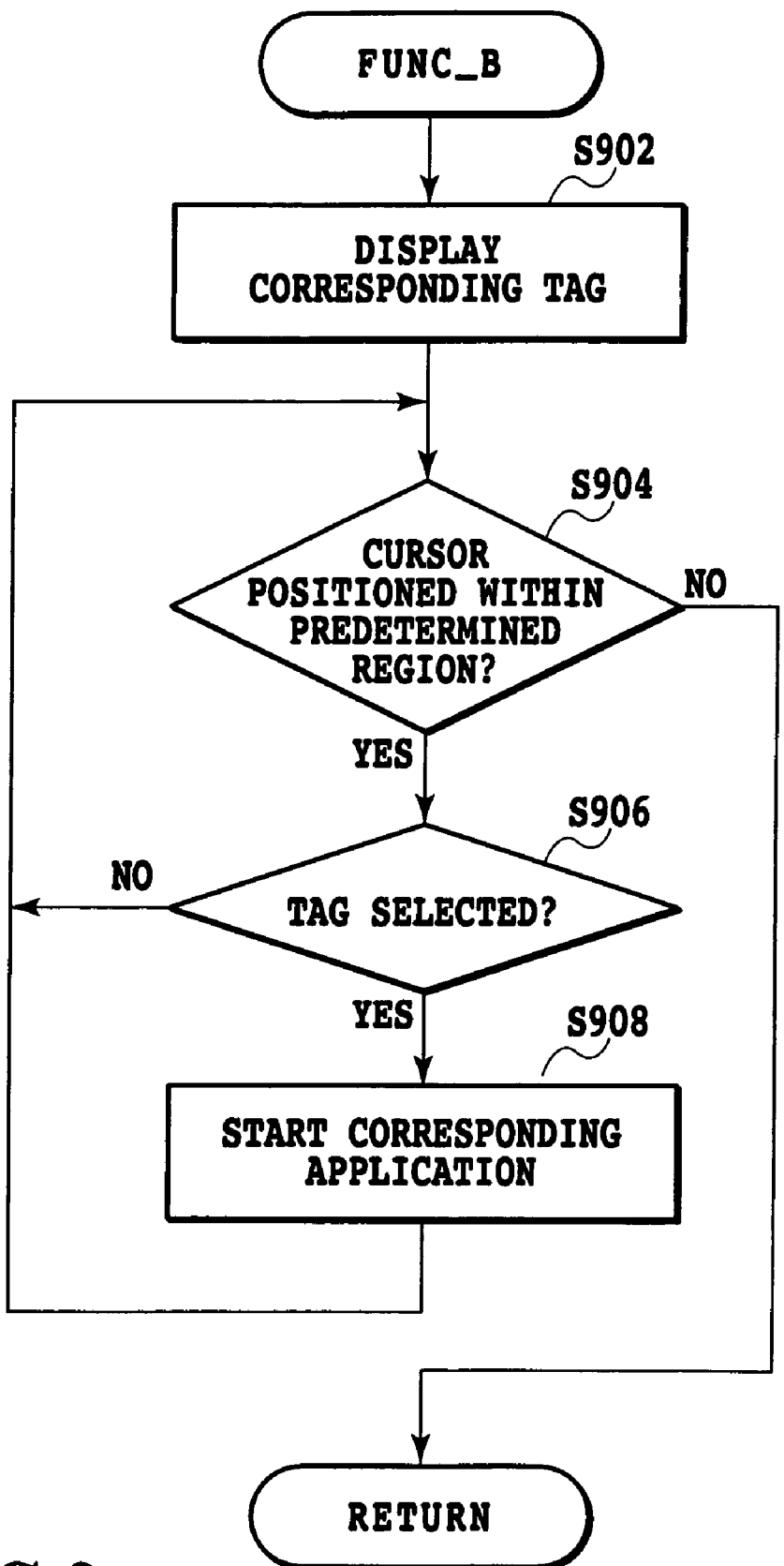
FIG. 9 is a flowchart showing an example of processing to be executed by a computer on the basis of a function contained in the business card information processing program.

FIG. 9 shows another example of processing to be executed by the electronic business card processing device on the basis of a function func_B contained in the business card information processing program. In this embodiment, in Step S502 of FIG. 4, it is judged whether the cursor is positioned in a text field included in the business card. The electronic business card processing device displays a tag corresponding to the area in which the cursor is positioned so as to overlap the displayed electronic business card (Step S902). This tag is an object selectable when starting an application program different from the business card information processing program.

During execution of the func_B, the electronic business card processing device judges whether the cursor is in a predetermined area from a signal of the pointing device in Step S904, and when the cursor is out of the predetermined area, the process returns to the function func_A. When the cursor is in the predetermined area, the process transfers to Step S906, and judges whether the tag has been selected by using the cursor. Then, when the tag is selected, a corresponding application is started (Step S908). When starting, the electronic business card processing device supplies information on the electronic business card being displayed as arguments to the application. The electronic business card processing device which has started the application returns to Step S904, and executes monitoring of the cursor position and monitoring of tag selection again. Step S908 is a process for only making another application active, and the process returns to Step S904 without interrupting the execution of func_B by the started application. Therefore, even during execution of the application that has been made active, func_B is executed in the background.

Figure 10:
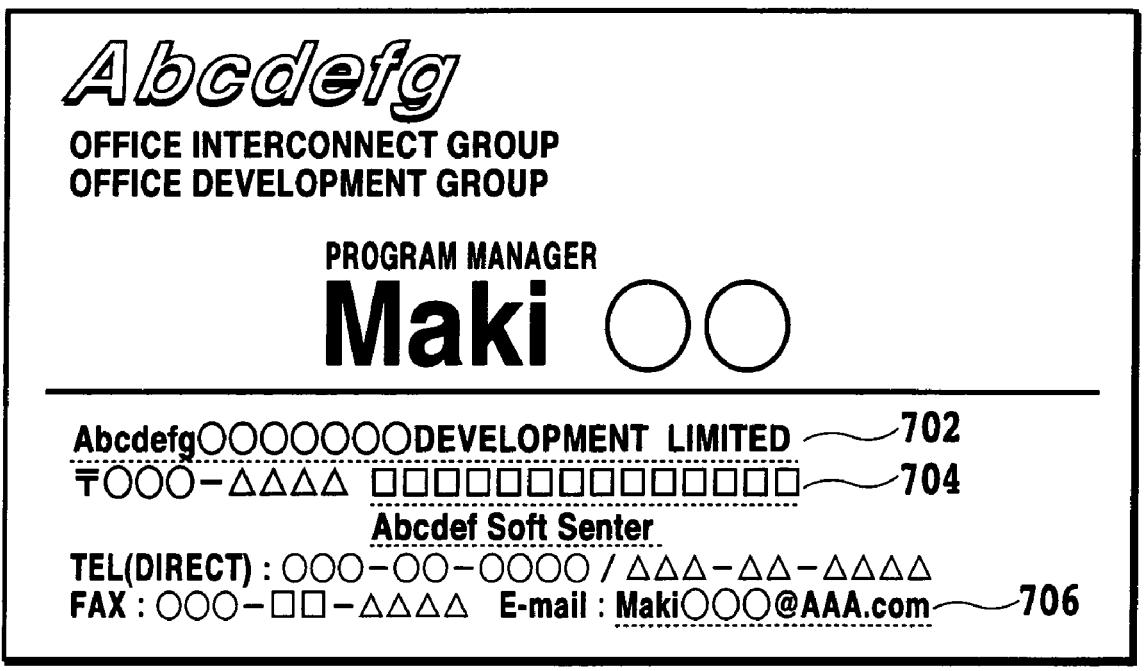
FIG. 10 shows an example of an image to be displayed on the display screen of a computer.

FIG. 10 shows an example of an electronic business card to be displayed on the display screen in an embodiment of the invention. This electronic business card occupies a part of area of the display of the electronic business card processing device. The electronic business card includes three areas for a company name 702, an address 704, and an e-mail address 706.

Figure 11:
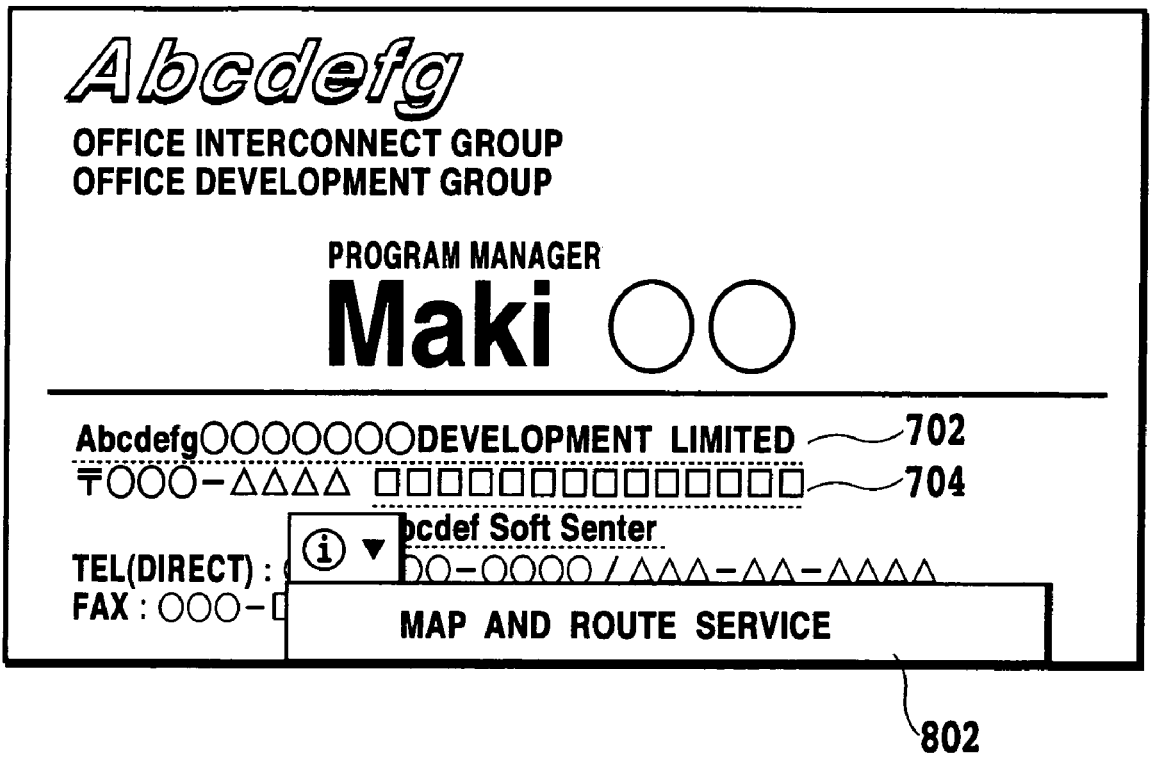
FIG. 11 shows an example of an image to be displayed on the display screen of a computer.

FIG. 11 shows an example of a display when the cursor is positioned on the address 704. In response to positioning of the cursor, a tag 802 indicated as "Map and Route Service" is displayed. In this embodiment, this tag is continuously displayed while the cursor is positioned on the address 704 or the tag 802.

A Map and Route Service command to be executed by selection of the tag is described. In the example shown in FIG. 11, the application corresponding to the tag 802 is a browser. In this embodiment, when the tag 802 is selected, the electronic business card processing device specifies an address of a web page for providing map information, and starts the browser.

Figure 12:
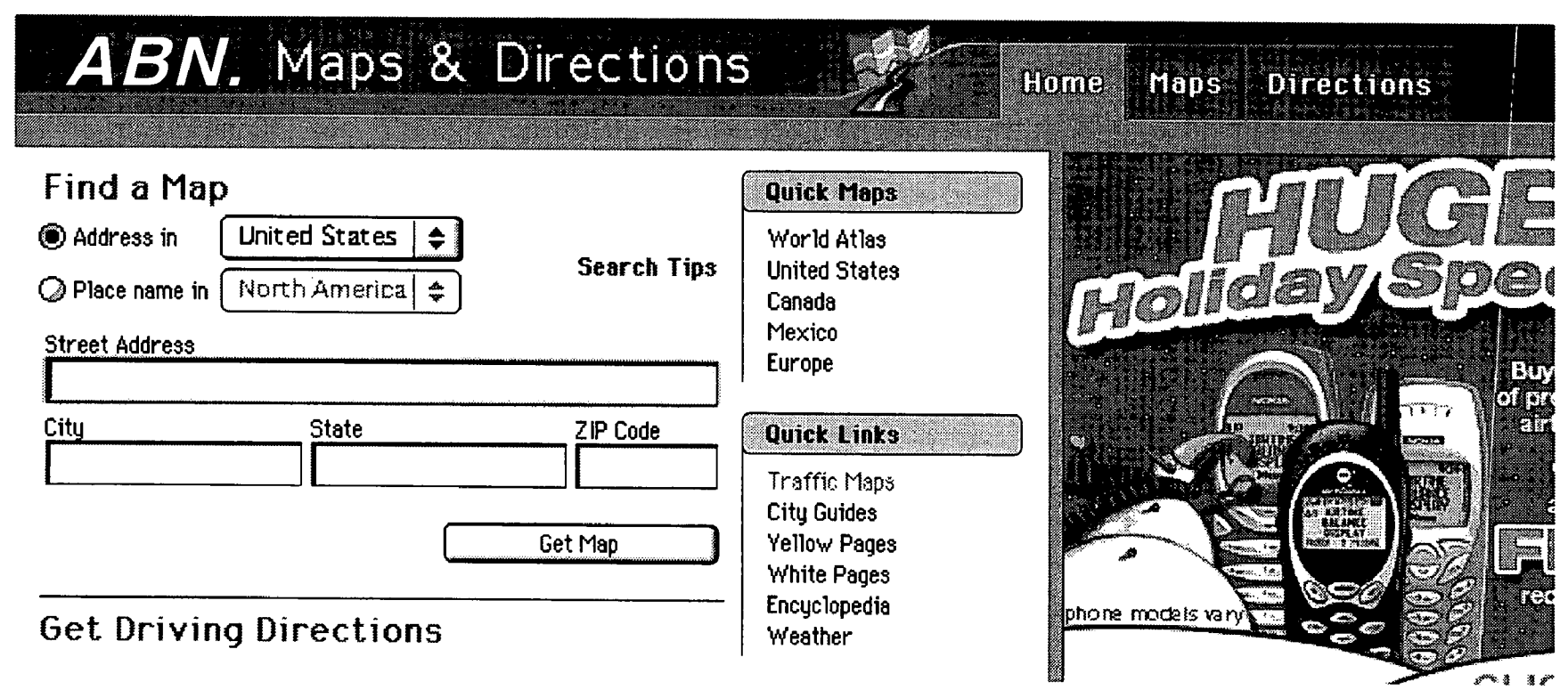

FIG. 12 shows an example of a web page of a map information providing website which is displayed when the browser is executed. The web page shown in this figure includes option buttons for selecting which of an address and a place name is to be inputted, a list box for specifying a country name or a domestic region, and areas for inputting a street address, a city, a state, and a postal code. Normally, a user properly selects a button and a list box and inputs necessary information, and selects the button "Get Map." The electronic business card processing device that has started the browser is a client for a web server that provides the map information providing website. The web server consists of one or a plurality of electronic business card processing devices that manage the database storing map information. The information inputted by a user is transmitted to the web server, and the web server supplies the received information to a CGI, acquires corresponding map information from the database, and transmits the information back to the client. The electronic business card processing device that has received this map information displays a map image in the form of the web page by using the browser being run. Thus, provision of map information to a user is realized.

In this embodiment, when the browser is started, the URL of the map information providing website and a character string of the address contained in the electronic business card being displayed are supplied to the browser. The browser accesses the map information providing website by using the received URL and transmits the character string of the address to the map information providing website. Namely, a normal search request is made by user operation on a web page as a trigger, however, in this embodiment, it is made in response to selection of a tag. The map information providing website supplies the received information to the CGI, acquires corresponding map information from the database, and sends it back to the client.

Examples of fields composing the contact point information, tag command names, and examples of processings to be executed when corresponding tags are selected are shown below.

(1) Display the information contained in the address book installed in a mailer or a personal information management program.
(1) Start the mailer and display a new mail creation screen by setting a destination to the mail address.
(2) Start the browser and acquire a map corresponding to the address from the map information providing website.
(3) Display the company information contained in the address book installed in the personal information management program, and when no company information is contained in the address book, search for and display the website of the company based on browser execution.
(4) Table 2: Contents of tags to be displayed Data in the "Full Name" field is displayed in the area of name in the electronic business card. With the area of name, a tag for executing the Open Contacts command is associated. The tag is displayed in the case where the cursor is positioned at the area of name in the electronic business card and when the tag is selected, the data of the Full Name field is supplied to the mailer or personal information management program. The mailer or personal information management program displays information in the address book corresponding to the received information.

Data in the field of "EmailAddress1," "EmailAddress2," or "EmailAddress3" is displayed in the area of mail address in the electronic business card. With the area of mail address, a tag for executing the Send Mail command is associated. The tag is displayed in the case where the cursor is positioned at the area of mail address in the electronic business card and when the tag is selected, the data in the field of "EmailAddress1," "EmailAddress2," or "EmailAddress3" is supplied to the mailer. The started mailer displays a window for creating a new mail by setting the received information as a destination address.

Data in the fields of "Home Address," "Business Address," and "Other Address" are displayed in the area of address in the electronic business card. Data in the fields of "Business AddressPostalCode," "HomeAddressPostalCode," and "OtherAddressPostalCode" are displayed in the area of postal code in the electronic business card. With the areas of address and postal code, as described above, a tag for executing a Map and Route command for executing a browser is associated.

The field of "Company Name" is displayed in the area of company name in the electronic business card. With the area of company name, a tag for executing an Open Company command is associated. The tag is displayed in the case where the cursor is positioned at the area of company name in the electronic business card and when this tag is selected, company information contained in the address book installed in the personal information management program is displayed. When no corresponding company information is contained in the address book, a website of the company is searched for on the basis of execution of the browser and displayed.

Data in the field of "WebPage" is displayed in the area of web page of the mail address in the electronic business card. With the area of the web page, a tag for executing an Open Web Page command is associated. The tag is displayed in the case where the cursor is positioned at the area of web page in the electronic business card, and when this tag is selected, the data in the field of "Web Page" is supplied to the browser. The browser accesses a web server by using the received information as a URL.

Furthermore, the information to be supplied to the application that should be started may not be information itself in the field composing the contact point information, and for example, it may be a part of information in the field. For example, when the field of "Full Name" consists of a field of a family name and a field of a personal name, it is also possible that, in response to execution of the Open Contact command, only the field of family name in the field of "Full Name" is supplied to the mailer.

Furthermore, as clearly understood from the description of the field of Company Name, information to be supplied to an application that should be started may be information in an arbitrary field contained in the contact point information. In one embodiment, as contact point information, an account name to be used by a messenger is provided. This information is not displayed as a business card, however, a tag can be associated with this information. The electronic business card processing device starts a messenger in response to selection of a tag and supplies the account to the messenger, whereby it can also automatically execute processing (for example, account registration) relating to account management.

Furthermore, it is also possible that the information in the fields are supplied to applications after being corrected.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An electronic business card processing device having a display and a pointing device, comprising means for: storing information relating to business cards; displaying a business card on the display on the basis of the stored information; determining when a cursor is positioned within a frame of the displayed business card; displaying a tool box on the displayed business card in response to the cursor being positioned within the frame of the displayed business card, where the tool box has a plurality of buttons; receiving signals from the pointing device that has selected one of the buttons; executing processing corresponding to the selected button by using information unique to the displayed business card; wherein the executing means starts an application program associated with the selected button, wherein each button is associated with a different function, and supplies information unique to the displayed business card to the started application program; wherein one of the buttons within the tool box is an update command that is executable when information within the displayed business card is different from information that is stored for the displayed business card; and wherein the application program has a function of an address book.

2. The electronic business card processing device according to claim 1, wherein information unique to the displayed business card contains information on additional pages of the business card, and the executing means re-displays the displayed business card by using the additional page information.

3. The electronic business card processing device according to claim 1, wherein the executing means adds a file to the information relating to the business card.

4. The electronic business card processing device according to claim 1, wherein the information relating to the business card contains animation, and the executing means displays the animation.

5. The electronic business card processing device according to claim 1, wherein the application is a browser.

6. The electronic business card processing device according to claim 5, wherein the information relating to the business card contains a voice file, and the executing means reproduces the voice file by starting a voice file reproducing program.

7. The electronic business card processing device according to claim 5, wherein the information relating to the business card contains a video file, and the executing means reproduces the video file by starting a video file reproducing program.

8. The electronic business card processing device according to claim 5, further comprising means for accessing a map information providing website on the basis of execution of the browser.

9. An electronic business card processing method to be executed by an electronic business card processing device having a display, a pointing device, and a memory for storing information relating to business cards, comprising the steps of: displaying a business card on the display on the basis of the stored information; displaying a tool box on the displayed business card when a cursor of the pointing device is positioned on the displayed business card, where the tool box has a plurality of buttons; determining which of the plurality of buttons within the tool box are executable in response to a comparison of information on the displayed business card and information that is stored within an address book; receiving signals from the pointing device that has selected one of the buttons; and executing processing corresponding to the selected button by using information unique to the displayed business card; wherein, in the steps executed, an application program associated with the selected button is started, and the information unique to the displayed business card is supplied to the started application program; wherein each button is associated with a different function, and wherein the application program has a function of an address book.

10. The electronic business card processing method according to claim 9, wherein the information unique to the displayed business card contains additional page information for the business card, and in the steps executed, the displayed business card is re-displayed by using the additional page information.

11. The electronic business card processing method according to claim 9, wherein in the steps executed, a file is added to the information relating to the business card.

12. The electronic business card processing method according to claim 9, wherein the information relating to the business card contains animation, and in the steps executed, the animation is displayed.

13. The electronic business card processing method according to claim 9, wherein the information relating to the business card contains a voice file, and the executing means reproduces the voice file by starting a voice file reproducing program.

14. The electronic business card processing method according to claim 9, wherein the information relating to the business card contains a video file, and the executing means reproduces the video file by starting a video file reproducing program.

15. A computer-readable storage medium having computer executable instructions to be executed by an electronic business card processing device having a display, a pointing device, and a memory for storing information relating to business cards, comprising the steps of: displaying a business card on the display on the basis of the stored information; displaying a tool box on the displayed business card when a cursor of the pointing device is positioned on the displayed business card, where the tool bar has a plurality of buttons; receiving signals from the pointing device that has selected one of the buttons; and executing processing corresponding to the selected button by using information unique to the displayed business card; wherein, in the steps executed, an application program associated with the selected button is started, and the information unique to the displayed business card is supplied to the started application program; wherein each button is associated with a different function, and wherein the application program has a function of an address book.

16. The computer-readable medium according to claim 15, wherein the information unique to the displayed business card contains additional page information for the business card, and in the steps executed, the displayed business card is re-displayed by using the additional page information.

17. The computer-readable medium according to claim 15, wherein in the steps executed, a file is added to the information relating to the business card.

18. The computer-readable medium according to claim 15, wherein the information relating to the business card contains animation, and in the steps executed, the animation is displayed.

19. The computer-readable medium according to claim 15, wherein the information relating to the business card contains a voice file, and the executing means reproduces the voice file by starting a voice file reproducing program.

20. The computer-readable medium according to claim 15, wherein the information relating to the business card contains a video file, and the executing means reproduces the video file by starting a video file reproducing program.

21. A computer-readable storage medium having computer executable instructions to be executed on electronic business card processing device having a display and a pointing device, wherein in the steps comprise: storing information relating to business cards; displaying a business card on the display on the basis of the stored information; displaying a tool box on the displayed business card in response to positioning of a cursor of the pointing device on the displayed business card, where the tool box has a plurality of buttons; wherein at least one of the button is only selectable when there are differences between information that on the displayed business card and information that is stored relating to the business card; receiving signals from the pointing device that has selected one of the buttons; executing processing corresponding to the selected button by using information unique to the displayed business card; wherein the executing starts an application program associated with the selected button, and supplies information unique to the displayed business card to the started application program; wherein each button is associated with a different function, and wherein the application program has a function of an address book.

22. The computer-readable storage medium according to claim 21, wherein information unique to the displayed business card contains information on additional pages of the business card, and the executing means re-displays the displayed business card by using the additional page information.

23. The computer-readable storage medium according to claim 21, wherein the executing means adds a file to the information relating to the business card.

24. The computer-readable storage medium according to claim 21, wherein the information relating to the business card contains animation, and the executing means displays the animation.

25. The computer-readable storage medium according to claim 21, wherein the application is a browser.

26. The computer-readable storage medium according to claim 25, wherein the information relating to the business card contains a voice file, and the executing means reproduces the voice file by starting a voice file reproducing program.

27. The computer-readable storage medium according to claim 25, wherein the information relating to the business card contains a video file, and the executing means reproduces the video file by starting a video file reproducing program.

28. The computer-readable storage medium according to claim 25, further comprising means for accessing a map information providing website on the basis of execution of the browser.

\* \* \* \* \*